E. P. WORTH.
NUT LOCK.
APPLICATION FILED NOV. 1, 1911.
1,059,420.
Patented Apr. 22, 1913.
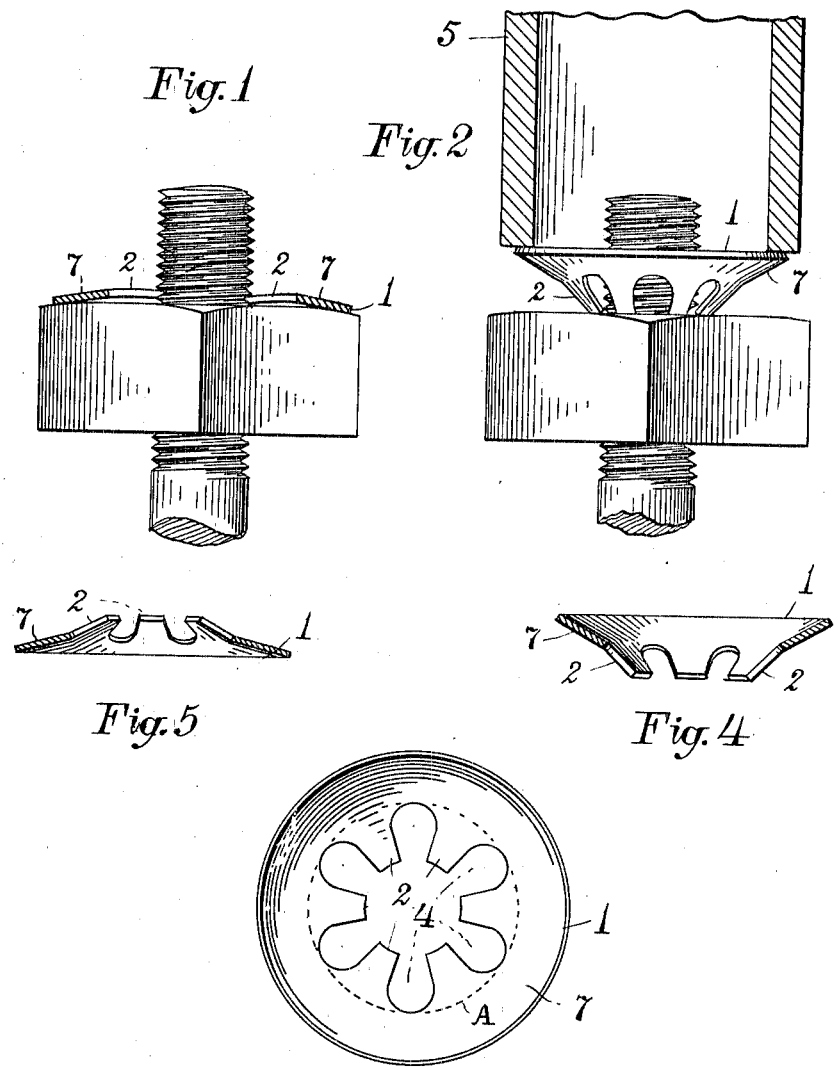

UNITED STATES PATENT OFFICE.

ELVIN P. WORTH, OF BOSTON, MASSACHUSETTS, ASSIGNOR, BY MESNE ASSIGNMENTS, TO STEEL SPECIALTIES COMPANY, OF BOSTON, MASSACHUSETTS, A CORPORATION OF MASSACHUSETTS.

NUT-LOCK.

1,059,420.     Specification of Letters Patent.     Patented Apr. 22, 1913.

Application filed November 1, 1911. Serial No. 657,913.

*To all whom it may concern:*

Be it known that I, ELVIN P. WORTH, a citizen of the United States, and a resident of the city of Boston, in the county of Suffolk and Commonwealth of Massachusetts, have invented certain new and useful Improvements in Nut-Locks, of which the following is a specification.

The object of this invention is the construction of an improved nut locking device which may be applied to the bolt after the nut has been screwed down thereon, and which can be made by a blow or two so to grip the bolt as to render the nut incapable of becoming accidentally loose thereon.

In the drawings forming part of this specification, Figure 1 is a side view of a bolt and nut, showing the nut lock in section thereon. Fig. 2 is a side view of said parts, showing the nut lock about to be fixed in position. Fig. 3 is a plan view of the nut lock alone. Fig. 4 is a side sectional elevation of the nut lock alone. Fig. 5 is a side sectional view of the same, but in the reversed position which it will assume when it has been pressed slightly past a flat conformation, but is not restrained by the influence of the nut and bolt.

This invention is based upon the known fact that when a rounded or conical metallic plate is forced to a flattened position, it will either snap back to its former convexity, or to a similar convexity in a reversed direction. In the utilization of this characteristic, a washer 1, illustrated in Fig. 3, is formed with a plurality of centrally extended fingers 2, the extremities of which are shortened sufficiently to form a hole of materially less diameter than that of the bolt for which the nut lock is designed. Between these fingers are radial slots 4 the outer ends of which are preferably rounded. It is also necessary, for the increased resilience of the fingers, to have their radial length materially greater than their width. After this washer has been thus fashioned, or preferably at the same time and by the same blow as that which punches it out, it is given a cup-shape and made to conform to approximately a frustum of a cone, as shown in Figs. 2 and 4. This formation so separates the finger ends from each other that the nut lock can be easily slipped down over the bolt for which it is designed, with its concave surface upward, as in Fig. 2. A tubular tool 5 is now applied to the outer portion of the nut lock and forced strongly downward, preferably by suitable hammer strokes. When the nut lock lies flat upon the nut and the pressure removed, it will either snap back toward its former position, or tend to reverse itself, for the expanding tension thus put upon the outermost particles of the device will not permit it to remain inertly flat, provided the metal composing it is not a non-resilient one such as lead. But even low grade steel is sufficiently resistent for the purpose, and is the metal which I prefer to employ.

Inasmuch as the sheet metal composing the nut lock is thinner than the pitch of the threads on the bolt, and the ends of the fingers 2 have a slight play between the said threads, and since the pressure of the tool 5 will not permit the peripheral section of the nut lock to rise, the teeth and the inner periphery of the same are the only parts which can move, and these can only move upward slightly. But this movement is enough to insure against the possibility of the outer periphery's snapping upward, and to cause so strong an opposing pressure of the nut lock between the upper surface of the nut and the under surfaces of the teeth or threads of the bolt, as to securely lock the nut against accidental turning. The said inner periphery of the nut lock is indicated by the dotted circle A in Fig. 3.

Ordinarily, the upper surface of the nuts is more or less rounded, as shown in Figs. 1 and 2, so that it aids in the reversing of the nut lock; but even without this, the latter readily assumes the reverse position, as indicated in Fig. 1, because of the slightly steeper angle given to the fingers than to the annular part 7 of the nut lock. As represented in Figs. 2 and 4, the said part 7 is preferably given an angle of thirty degrees with respect to the plane of the base, and the fingers are given an angle of about forty-five degrees relative to the same. This permits said annular part to assume the desired reverse position with scarcely any elevation of the ends of the fingers, as represented in Fig. 1, and thereby maintains the nut lock securely in such position. It is evident, therefore, that the nutlock possesses two means for check the rotation of the nut, one consisting of the centripetal grip of the finger-ends against the bolt between its threads, and the other consisting of the torsional strain of the annulus 7 causing its outer periphery to be strongly pressed downward upon the surface of the nut. The latter pressure engenders friction with such surface adapted to keep the nut from beginning to unscrew, and so insures against the slightest unloosening of the nut. At the same time, the insertion of a sharp chisel edge beneath the outer edge of the nut lock is capable of springing the same back toward its original position, far enough to permit its withdrawal from the bolt.

This nut lock is consequently very inexpensive to manufacture, easy to apply and easy to remove, while at the same time it is certain and efficient in its locking function.

What I claim as my invention and for which I desire Letters Patent is as follows, to wit:—

1. A nut lock comprising an annulus having a plurality of centrally projecting fingers, the annulus and fingers being conical in general contour, and the fingers being made resilient relative to the annulus.

2. A nut lock comprising an annulus having a plurality of centrally projecting fingers, the annulus and fingers being conical in general contour, and composed of resilient sheet metal, and the fingers being made narrow radially in order to render them resiliently flexible relative to the annulus.

3. A nut lock comprising an annulus formed with centrally projecting fingers, the inner ends of said fingers being curved concentric with the annulus, and made substantially equal in width to the space separating two adjacent fingers whereby they are resilient relative to the annulus, said annulus and fingers being conical.

4. A nut lock comprising an annulus formed with centrally projecting fingers, said fingers and annulus being conical, the fingers being more sharply conical than the annulus.

5. A nut lock comprising a washer formed with centrally projecting fingers the inner ends of which compose a hole of slightly greater diameter than the bolt for which the same is designed, said washer being made conical with an angle of approximately thirty degrees with respect to the base thereof, and said fingers being made conical with an angle of approximately forty-five degrees with respect to such base.

In testimony that I claim the foregoing invention, I have hereunto set my hand this 30th day of October, 1911.

ELVIN P. WORTH.

Witnesses:
A. B. UPHAM,
ALEX. L. PECKHAM.